Sept. 26, 1967 R. B. CANNON 3,343,725
BOTTOM DISCHARGE BIN
Filed June 9, 1965 5 Sheets-Sheet 1
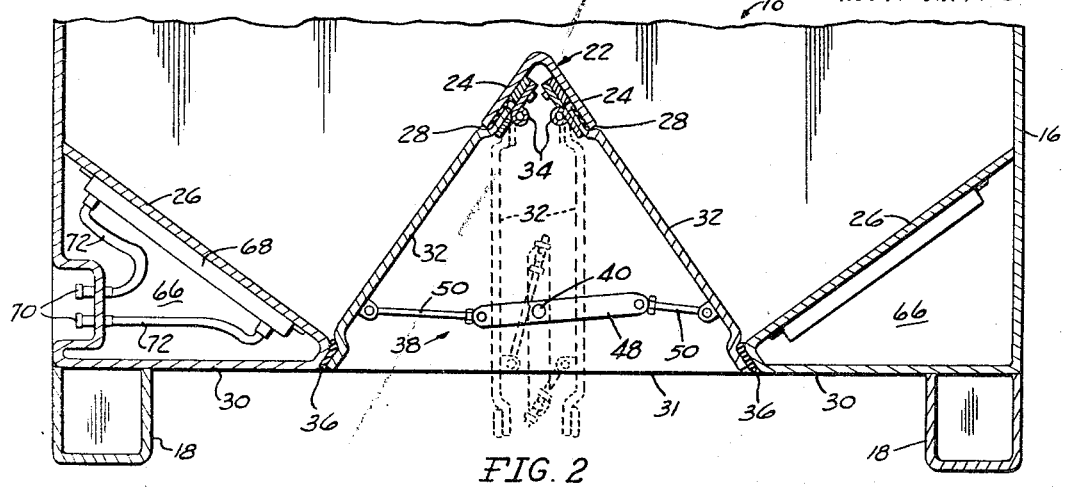
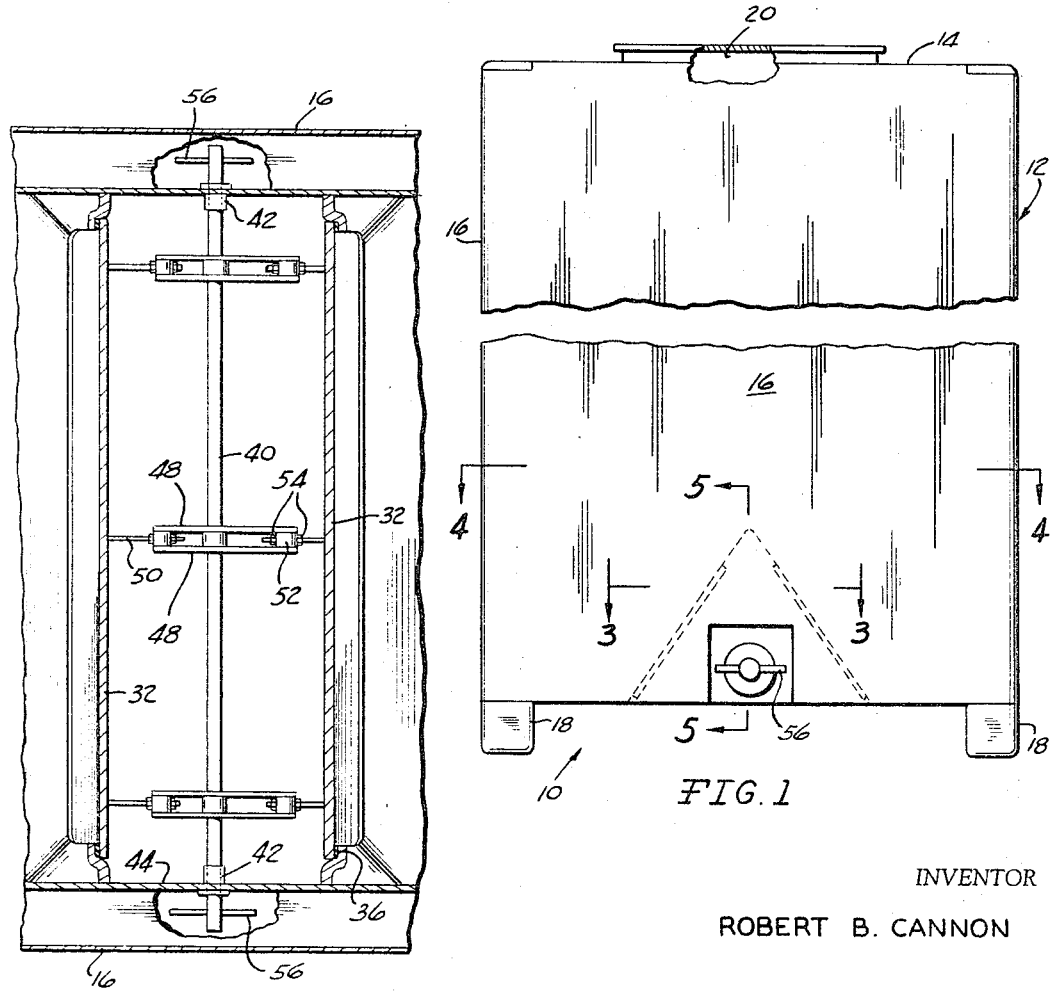
INVENTOR
ROBERT B. CANNON
BY Olsen and Stephenson
ATTORNEYS Sept. 26, 1967    R. B. CANNON    3,343,725
BOTTOM DISCHARGE BIN Filed June 9, 1965    5 Sheets-Sheet 2

INVENTOR

ROBERT B. CANNON

BY *Olsen and Stephenson*
ATTORNEYS

Sept. 26, 1967  R. B. CANNON  3,343,725
BOTTOM DISCHARGE BIN

Filed June 9, 1965  5 Sheets-Sheet 3

INVENTOR
ROBERT B. CANNON
BY Olsen and Stephenson
ATTORNEYS

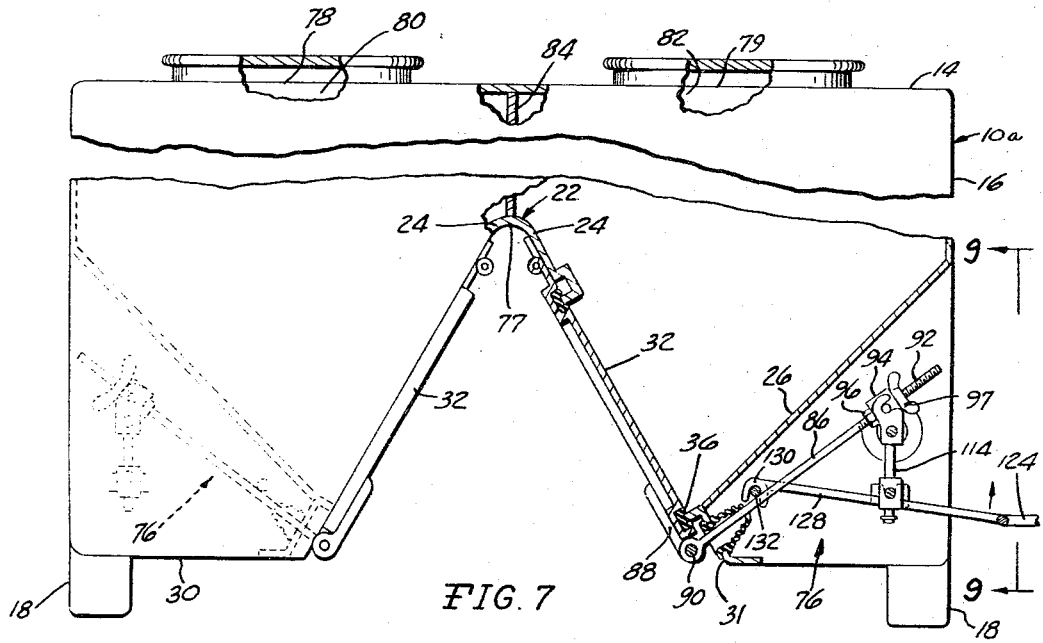
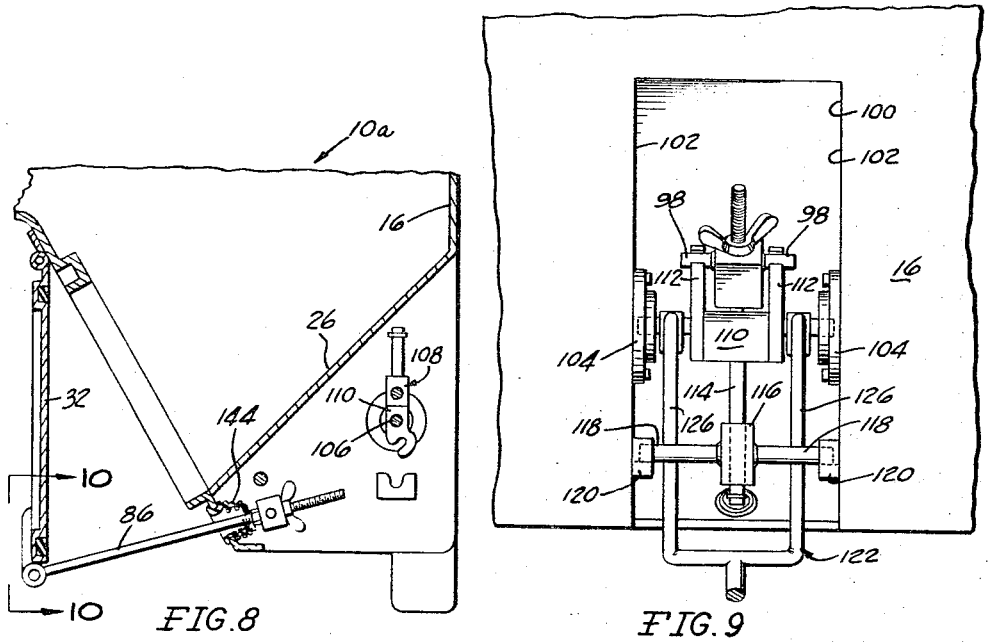
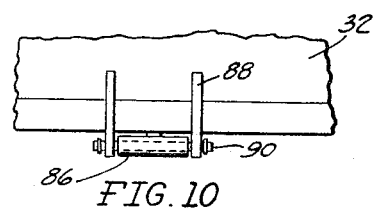

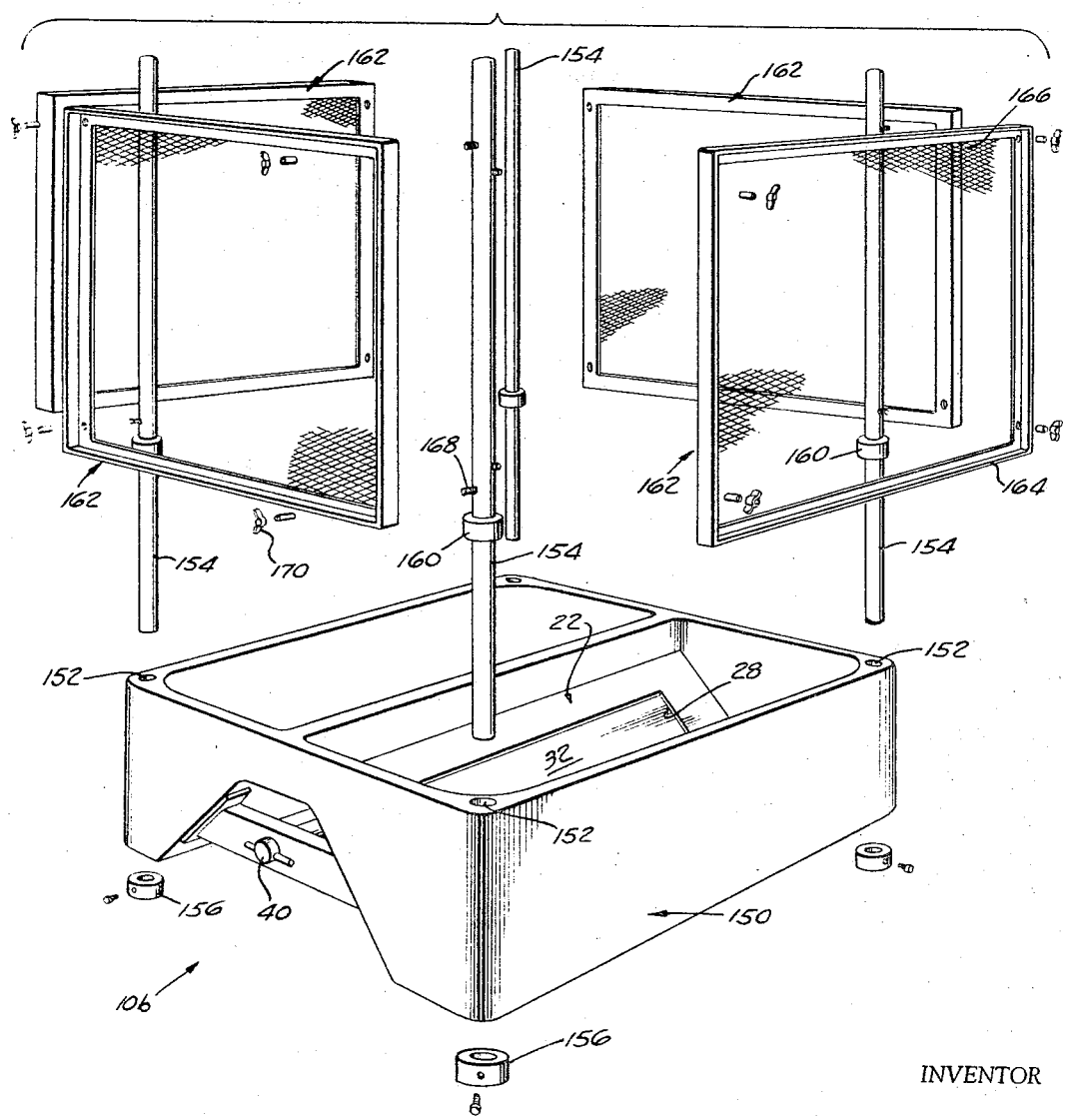

United States Patent Office 3,343,725
Patented Sept. 26, 1967

3,343,725
BOTTOM DISCHARGE BIN
Robert B. Cannon, Northport, N.Y., assignor to Hoover Ball and Bearing Company, Saline, Mich., a corporation of Michigan
Filed June 9, 1965, Ser. No. 462,646
7 Claims. (Cl. 222—129)

This invention relates generally to apparatus for storing and transporting a solid or semi-liquid product having the ability to flow by gravity, and more particularly to an improved top loading, bottom discharge bin for storing and transporting material of this type.

The principal object of this invention is to provide an improved bin which includes a bottom wall section of substantially inverted V-shape provided with discharge openings and closure doors which are readily moved between open and closed positions to thereby facilitate the discharge of material from the bin without a requirement for special discharge station equipment.

Further objects, features and advantages of this invention will become apparent from a consideration of the following description, the appended claims, and the accompanying drawing in which:

FIGURE 1 is a foreshortened side elevational view of the improved bin of this invention;

FIGURE 2 is a fragmentary vertical sectional view of the lower end portion of the embodiment of the bin of this invention shown in FIG. 1, showing the discharge doors in solid lines in closed positions and the actuating mechanism therefor in solid lines in the overcenter positions to which they are moved following closing of the doors and showing the doors and the actuating mechanism in broken lines in open positions of the doors, and as seen from substantially the line 2—2 in FIG. 4;

FIGURE 3 is a fragmentary horizontal sectional view of a portion of the bin of this invention looking substantially along the line 3—3 in FIG. 1;

FIGURE 7 is a fragmentary vertical sectional view, similar to FIG. 2, showing a modified form of the bin of this invention, with the bin discharge doors in closed positions;

FIGURE 8 is a fragmentary sectional view similar to FIG. 7 showing a bin discharge door in open position;

FIGURE 9 is a fragmentary elevational view of a portion of the bin shown in FIG. 7 looking substantially along the line 9—9 in FIG. 7;

FIGURE 10 is a fragmentary detail sectional view of a portion of the bin as seen from the line 10—10 in FIG. 8;

FIGURE 13 is an exploded perspective view of the bin shown in FIG. 12.

Figure 4:
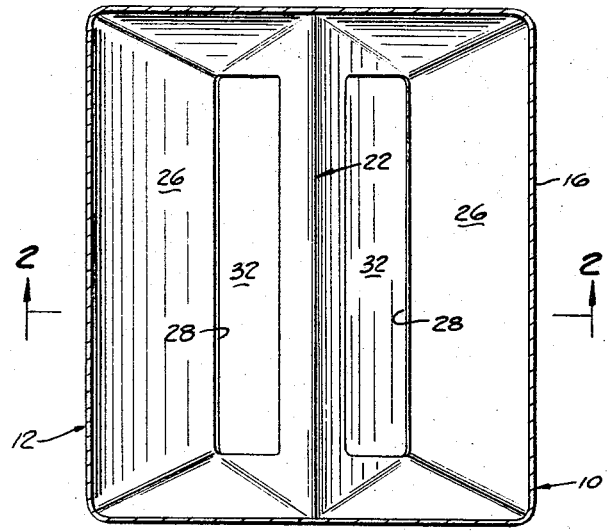
FIGURE 4 is a horizontal sectional view of the bin of this invention, looking downwardly substantially on the line 4—4 in FIG. 1.
Figure 5:
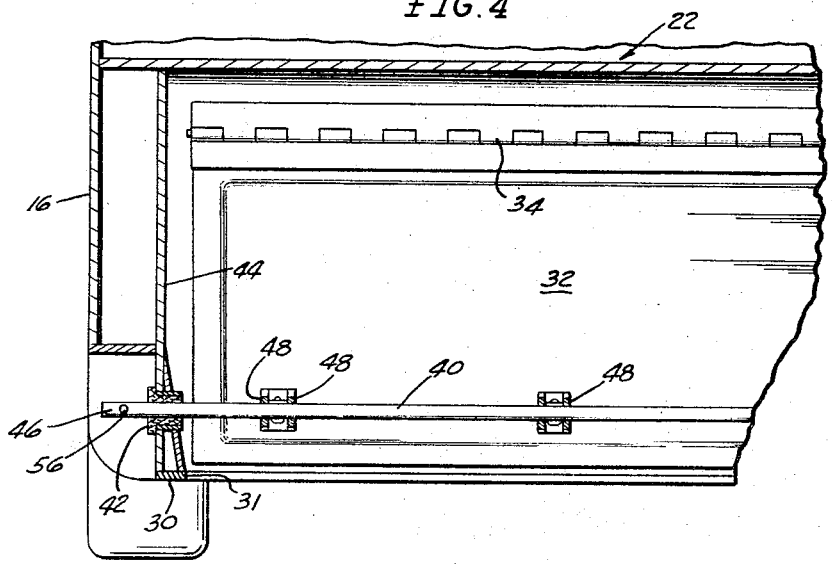
FIGURE 5 is a fragmentary detail sectional view of a portion of the bin of this invention looking substantially along the line 5—5 in FIG. 1.

With reference to the drawing, one form of the improved bin of this invention, indicated generally at 10, is illustrated in FIGS. 1–6, inclusive, as including an upright body 12 which is generally rectangular in cross section having a top wall 14, side retaining walls 16, and supporting legs 18 which extend downwardly from the corners of the body 12. The bin 10 is loaded through an opening 20 in the top wall 14. As shown in FIG. 2, the body 12 is provided with a bottom wall, indicated generally at 22, which is generally of W-shape, having downwardly diverging inner wall portions 24 and downwardly converging outer wall portions 26. The downwardly diverging inner wall portions 24 constitute a wall section which is of generally inverted V-shape, and the wall portions 26 act as slope sheets to direct material toward bin discharge openings 28 which are formed in the wall portions 24 adjacent their lower ends. The bin 10 also has a generally horizontal floor 30 that extends between the lower ends of the side walls 16 and has a rectangular opening 31 (FIGS. 2 and 5) disposed below the bottom wall 22.

The discharge openings 28 are closed, when the bin 10 is loaded, by a pair of discharge doors 32 each of which is supported on a hinge assembly 34 secured to a wall portion 24 adjacent the upper end of the discharge opening 28 so that each door 32 can swing between its closed position illustrated in solid lines in FIG. 2 and a downwardly extending open position illustrated in broken lines in FIG. 2. In its closed position, each door seals against a gasket 36 mounted on the bin so that it extends about the bin opening 28.

In the form of the invention shown in FIG. 1, the doors 32 are opened and closed by a door actuating assembly 38 which includes a horizontal actuating shaft 40 mounted at its ends in bearings 42 (FIG. 3) which are supported on the bin body 12 at opposite ends of the discharge openings 28. Each bearing 42 is mounted in a wall 44 located inwardly of an adjacent bin side wall 16 so that the ends 46 of the shaft 40 are located within the dimensional confines of the bin 10.

A plurality of lever members 48, arranged in pairs, are secured intermediate their ends to spaced portions of the shaft 40. Each pair of lever members 48 extends transversely of the shaft 40, and is pivotally connected to one end of a link 50, the opposite end of which is pivotally connected to a door 32. As shown in FIG. 3, adjacent ends of a pair of lever members 48 are connected by a block 52. A threaded end portion of a link 50 extends through the block 52 so that nuts 54 on the link engage opposite ends of the block 52. The effective length of a link 52 is thus variable by adjustment of the nuts 54 thereon.

It can thus be seen that with the doors 32 in their closed positions, when the shaft 40 is rotated in a clockwise direction, as viewed in FIG. 2 from the overclosed position of the actuating assembly 38 shown in solid lines therein, the levers 48 are rotated in directions tending to concurrently move the doors 32 toward downwardly extending open positions shown in FIG. 2 in broken lines. If a regulated flow of material from bin 10 through the discharge openings 28 is desired the doors 32 can be maintained in partially open positions by maintaining shaft 40 in a partially rotated position.

Figure 6:
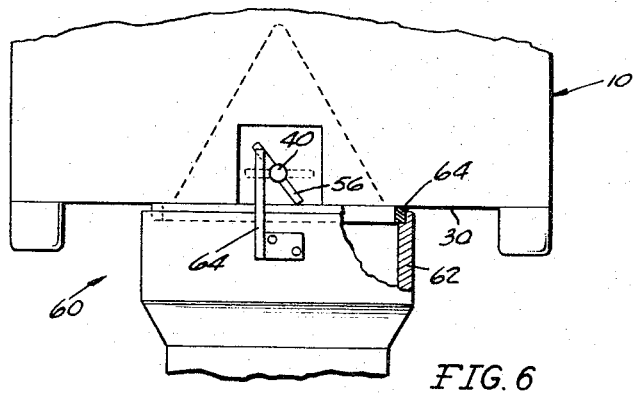
FIGURE 6 is a side elevational view of the bin shown in FIG. 1, illustrating the bin at a discharge station constructed to provide for automatic discharge of the bin.

During rotation of the actuating shaft 40 in a clockwise direction as viewed in FIG. 2, the weight of the bin contents acts on the doors 32 to assist in opening of the doors. This opening of the doors can be accomplished manually by rotation of handles 56 secured to the ends of the shaft 40 so that they extend transversely thereof, or the doors may be automatically opened at a discharge station indicated generally at 60 in FIG. 6. The discharge station 60 includes a hopper 62 having an open upper end bounded by a resilient gasket 64 which is adapted to engage the bin floor 30 at a position surrounding the rectangular opening 31 in the bin floor 30. The discharge station 60 includes upright actuating bars 64, only one of which is shown in FIG. 6, mounted on the hopper 62. It is to be understood that the bars 64 can be mounted at any fixed position at the discharge station 60 such that the bars 64 will engage the handles 56 and rotate the shaft 40 in a clockwise direction (FIG. 6) as the bin 10 is lowered toward the hopper 62. During lowering of the bin 10, such as by means of a fork lift truck, the bars 64 engage the handles 56 so as to rotate them in a clockwise direction as viewed in FIG. 6 so as to open the doors 32 when the bin 10 has been lowered to a position in which the bin floor 30 is in sealing engagement with the gasket 64. It can thus be seen that a dust free discharge station 60 is provided at which the bin 10 is automatically discharged into the hopper 62 when the bin 10 is in the discharge position shown in FIG. 6.

The discharge doors 32 are readily closed, at any time following disengagement of handles 56 from bars 64, by rotating the shaft 40 in a counterclockwise direction as viewed in FIGS. 2 and 6 to move the lever members 48 to positions in which the doors 32 sealingly engage the gaskets 36 as shown in solid lines in FIG. 2. The lever members 48 and the links 50 co-operate to form a toggle linkage which is operable to efficiently open and close doors 32.

It can thus be seen that the bin 10 is readily loaded through the top opening 20 when the doors 32 are closed by movement of the lever members 48 to the position shown in FIG. 2. When it is desired to discharge the bin 10, it is readily moved to a discharge position by use of a common fork lift truck engaged with the floor 30. The bin 10 is then readily discharged without the necessity for tilting, rotating or inverting the bin, by merely rotating the shaft 40 in a clockwise position to provide for concurrent discharge of the bin contents through the openings 28 at the desired discharged rate. As shown in FIG. 2, in the full open position of the doors 32 they are above the lower ends of the bin legs 18, thereby avoiding the necessity for special discharge equipment since as a result the bin can be discharged directly into a floor opening, an open top receiver, or the like. The free flowing contents of the bin 10 are directed toward the discharge openings 28 by the inverted V-shape wall portions 24 and the outer wall portions 26. A maximum use of the internal capacity of the bin 10 is thus afforded, without the necessity for elaborate loading or unloading equipment or fixtures. The entire contents of the bin is discharged through the bottom discharge opening 28 while the bin is in its normal vertical position. It is not necessary to tilt, invert, rotate, etc., the bin from its vertical position to accomplish this discharge.

A further advantage is obtained by the inclusion in the bin 10 of this invention of the chambers 66 formed between the outer wall portions 26, the floor 30, and the side walls 16. As a result of the formation of the enclosed chambers 66, heat exchange units 68 can be mounted against the unexposed undersides of the outer wall portions 26. Fittings 70 are provided on the side wall 16 and are connected by lines 72 to the heat exchange units 68 which can be of the familiar plate or coil type positioned in direct contact with the wall portions 26. These fittings 70 can be connected to an auxiliary controlled temperature circulating system (not shown) to provide for flow of either a heating or a cooling agent through the heat exchange units 68. This allows for either heating or cooling of the bin contents during storage so that the user can produce or maintain a desired product temperature for storage purposes. As an example, a food product might require a constant temperature period of eighteen hours between final processing and packaging. When storing the product in the bin 10, a cooling or heating agent can be circulated through the heat exchange units 68 during storage of the bins 10 at room temperature to maintain the desired product temperature for packaging.

A modified form of the bin of this invention, indicated generally at 10a, is illustrated in FIGS. 7-11, inclusive. The bin 10a is identical in all respects to the bin 10 except that a pair of door actuating assemblies 76 are substituted in bin 10a for the door actuating assembly 38 in the bin 10 and inverted V-shape slots 77 are provided in the two bin walls 16 located at the ends of the discharge doors 32. Like numerals are used, therefore, on the bin 10a to indicate like parts on the bin 10 and it is to be understood that heat exchange units 68 can be used on the bin wall portions 26 in the bin 10a, the same as in the bin 10, even though the units 68 are not illustrated in FIGS. 7-11 for simplicity purposes. Since the assemblies 76 are identical, only one will be described in detail hereinafter with like numerals indicating like parts on the assemblies.

The bin 10a is illustrated as being provided in its top wall 14 with a pair of filling openings 78 and 79 which communicate with chambers 80 and 82, respectively, in the bin 10a which are separated by an internal partition 84 that extends between the top wall 14 and the downwardly diverging wall portions 24, to illustrate the adaptability of the bin 10a to use as a container for more than one product. The bin 10a can be provided with a single filling opening and the partition 84 can be omitted if the bin is to be used with a single product. Each of the discharge doors 32 is provided with a door actuating assembly 76 so that the doors 32 are individually operable to separately discharge the contents of the bin chambers 80 and 82, if desired.

A door actuating assembly 76 includes an actuating or pull rod 86 which is pivotally connected at one end to the lower end of the door 32 by means of a bracket 88 secured to the door 32 and provided with a pin 90 on which one end of the rod 86 is rotatably supported. The opposite end portion 92 of the rod 86 is threaded and has a block 94 slidably mounted thereon for movement between adjusted positions determined by the positions of a nut 96 and a hand wheel nut 97 threadably mounted on the rod portion 92 on opposite sides of the block 94 so as to function as stop nuts. Axially aligned stub shafts 98 project transversely outwardly from opposite sides of the block 94 for a purpose to appear presently.

One of the bin side walls 16 is formed with an opening 100 (FIG. 9) opposite the actuating rod 86, and support walls 102 are secured to and extended inwardly from the side wall 16 at opposite sides of the opening 102 and secured to the adjacent the wall portion 26. A pair of axially aligned bearings 104 are mounted on the walls 102 and a horizontal shaft 106 is supported on the bearings 104. A door locking and release unit 108 includes a body 110 rotatably mounted on the shaft 106. A pair of hooks 112 are mounted on and projected in one direction from the body 110 at positions such that they are engageable with the stub shafts 98 as shown in FIG. 9. A rod 114 projects in the opposite direction from the body 110 and has a sleeve 116 slidably supported thereon. Stub shafts 118 are secured to and projected in opposite directions from the sleeve 116 at positions such that the stub shafts 118 are supportable in cradle brackets 120 secured to the walls 102, when the rod 114 is in its upright position shown in FIG. 7.

A door 32 is maintained in a closed position, shown in FIG. 7, by the engagement of the hooks 112 with the stub shafts 98 when the stub shafts 118 are supported in the cradle brackets 120. The door 32 is maintained in a dust-tight closed position by adjustment of the nuts 96 to position the block 94 such that when the stub shafts 98 are so engaged by the hooks 112, a pulling force of the necessary magnitude is applied to the actuating rod 86. To open the door 32, the sleeve 116 is moved upwardly on the shaft 114 to a position in which the stub shafts 118 are released from the brackets 120. The weight of the bin contents on the door 32 will then move the door 32 to the open position illustrated in FIG. 8. During such movement, the actuating rod 86 will move downwardly rotating the locking and release unit 108 about the shaft 106 until the hooks 112 have been moved to a position releasing the stub shafts 98. At such time, the actuating rod 86 will move to a position remote from the unit 108 as shown in FIG. 8.

The door 32 can be manually opened by means such as the tool 122 shown in FIGS. 7 and 9. The tool 122 includes a handle 124 secured to a pair of parallel spaced legs 126 formed on their terminal ends with sockets 130 shaped to engage a shaft 132 which extends between the walls 102. When the tool 122 is positioned so that the sockets 130 are supported on the shaft 132, the legs 126 straddle the rod 114 at positions engageable with the undersides of the stub shafts 118. As a result, when the tool 122 is swung upwardly in an arc, utilizing the shaft 132 as a pivot fulcrum, the legs 126 engage the stub shafts 118 and lift them out of the brackets 120. The purpose of the tool 122 is to enable discharge of bin 10a at any time and at any location desired.

Figure 11:
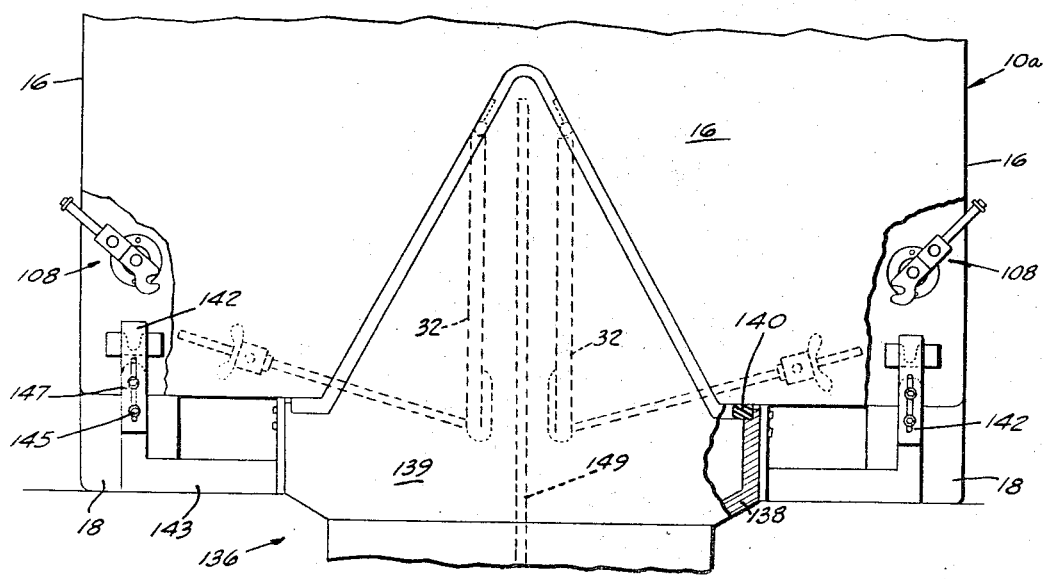
FIGURE 11 is a side elevational view of the bin shown in FIG. 7, illustrating the bin at a discharge station constructed to provide for automatic discharge of the bin.

The doors 32 can also be automatically opened at a discharge station 136 shown in FIG. 11. The discharge station 136 includes an upright hopper 138 having an open upper end and a pair of upwardly extending inverted V-shape side walls 139 on two sides. A resilient gasket 140 on the hopper upper end is of a size to sealingly engage the bin floor 30 at opposite sides of the opening 31 and at the slots 77 to provide for dust tight support of bin 10a on hopper 138. The discharge station 136 also includes a pair of actuating brackets or bars 142, arranged at the discharge station 136 and illustrated as being secured to supports 143 on the hopper 138. These bars 142 are secured by bolts 145 to the supports 143 so that if it is desired to unload the contents of only one bin chamber 80 or 82, the bar 142 not required could be removed thus making the door controlled by that bar inoperative. The assembly bolts 145 are mounted through slotted holes 147 in the bars 142 to allow for height adjustment of the bars for proper operation of the door release mechanisms 108. As the bin 10a is lowered toward the hopper 138, the bars 142 engage the stub shafts 118, at positions straddling the rods 114 and move the stub shafts 118 upwardly to positions in which they clear the cradle brackets 120, so that the locking and release units 108 can pivot to positions releasing the stub shafts 98 mounted on the actuating bars 86. As shown in FIGS. 7 and 8, the actuating rods 86 extend through resilient bellows-type gaskets 144 on the bin 10a so that when the bin is mounted with respect to the hopper 138 as shown in FIG. 11, the bin is in a dust-tight relation with the hopper 138, thereby providing a dust free discharge station 136. The hand wheel nut 97 (FIG. 7) enables manual opening of either of the doors 32 for a controlled distance. This allows for metering the discharge rate without actuating the door release device 76. In place of the bar assembly 142 there may be times when a remote control door opening device would be an advantage. An air-operated cylinder and push rod installed in place of the bar assembly 142 and controlled from a remote location allows door control for preplaced bins. With the above outlined door control methods the user has the following options:

(1) Manual opening of either or both doors at any location by means of the tool 122.

(2) Metered door opening control by means of the hand wheels 97.

(3) Automatic opening of either or both doors 32 as the bin is lowered into the discharge position. The weight of the product in the bin is utilized to accomplish the door opening.

(4) Remote control automatic opening of prepositioned bins.

When the contents of a chamber 80 or 82 have been removed, the door 32 for that chamber is moved to a closed position, the hooks 112 are engaged with the stub shafts 98, and the sleeve 116 is moved downwardly on the rod 114 until the stub shafts 118 are supported in the cradle brackets 120. The locking and release unit 108 then functions to maintain the door 32 closed until the sleeve 116 is moved upwardly on the rod 114 as above described.

It can thus be seen that the bin 10a includes substantially all of the advantages heretofore outlined for the bin 10. As shown in FIGS. 8 and 11, the bin legs 18 extend downwardly below the lower ends of the doors 32, when the doors 32 are open, to thereby obviate the necessity for special discharge equipment. The gravitational force of the bin contents on the doors 32 is utilized to open the doors in the bin 10a which are individually openable and closable to permit separate discharge of the bin chambers 80 and 82, which can also be concurrently discharged if desired. The actuating assemblies 76 extend upwardly from the door members 32 so as to be within the dimensional confines of the bin 10a and avoid interfering protuberances and interferences. One advantage of the bin 10b is that the compartments 80 and 82 can be filled with materials which it is desired to mix, and some mixing of this material is automatically obtained during concurrent discharge of the chambers 80 and 82. If it is desired to keep these materials separated, a dividing baffle 149 can be provided in the hopper 138, as shown in FIG. 11, so that the contents of compartments 80 and 82 are directed to different operations.

The bin 10a is also particularly adaptable to the handling of materials, such as food products, where sanitation precautions must be taken. The inverted V-shape cavity at the lower end of the bin which is bounded at its opposite sides by the discharge doors 32 and at its ends by the slots 77 is open at the bottom and at both ends for inspection and cleaning if required. This open characteristic of the cavity is due to the fact that mechanical equipment for operating the discharge doors 32 is entirely eliminated from the space between the doors. The door operating rods 86 are dust sealed from the cavity, and as shown in FIG. 11, the hopper side walls 139 are gasketed to provide for dust-tight delivery of the bin contents to the hopper 138 during discharge of the bin. The bin 10a can be thoroughly washed both inside and out when the bin is in a normal vertical position standing on any flat surface. The provision of the interior slope sheets 26 and the elimination of any concealed or inaccessible areas within the bin provide for natural drainage of the washing medium.

Figure 12:
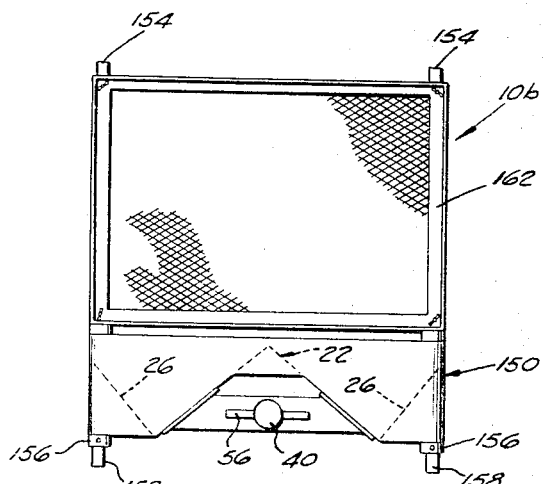
FIGURE 12 is a side elevational view of still another form of the bin of this invention.

Another modified form of the bin of this invention is illustrated in FIGS. 12 and 13 and designated generally at 10b. The bin 10b is similar to the bin 10 and is provided with an actuating assembly 38 which provides for concurrent opening and closing of the bin discharge doors 32, only one of which appears in FIG. 13. The distinguishing feature of the bin 10b is that it includes an integral bottom wall unit 150 which can preferably be cast as a single piece from a light-weight material such as plastic. The bottom wall unit 150 includes the generally W-shape bottom wall 22 which directs the bin contents toward the openings 28 during discharge of the bin and is provided at its corners with upright through openings 152 through which corner posts 154 are removably extended. The corner posts 154 extend downwardly below the wall unit 150, and are provided with locking collars 156 which engage and support the bottom side of the wall unit 120. The portions 158 of the corner posts 154 which extend below the bottom wall unit 120 thus constitute legs for the bin 10b which extend downwardly below the lower ends of the doors 32 in the open positions thereof, as previously explained in connection with bin 10. Upper collars 160 are positioned on the corner posts 154 at positions such that they engage the top side of wall unit 150 and define the length of the legs 158. The walls of the bin 10b are formed by removable wall panels 162 each of which consists of a frame 164 on which a strip 166 of wire screen or similar material is mounted. The panels 162 are secured to the corner posts 154 by screws 168 which extend into the posts and wing nuts 170 which engage the frames 164.

The bin 10b has the advantage that it may be knocked down for compact shipment in an open empty condition to the loading point. It is then loaded through its open upper end and transported to a discharge point for either manual discharge or discharge at a discharge station 60 (FIG. 6).

It will be understood that the bottom discharge bin which is herein disclosed and described is presented for purposes of explanation and illustration and is not intended to indicate limits of the invention, the scope of which is defined by the following claims.

What is claimed is:

1. A bin for transporting and storing bulk flowable material, said bin comprising an upright hollow body having side walls, a substantialy rectangular floor and depending legs disposed substantially at the corners of said floor, said floor having a central opening of substantially rectangular shape, a bottom wall section of substantially inverted V-shape disposed above said opening, a pair of horizontally spaced bin discharge openings in said bottom wall section at the lower end thereof extending substantially the fully length of said section in a horizontal direction, a pair of door members hinged at their upper ends on said wall section above said discharge openings for movement between positions opening and closing said discharge openings, each door member in the closed position thereof being positioned so that the weight of bulk material in said bin urges said door member toward its open position, means on said bin attached to said door members for moving said door members to said closed positions and allowing said door members to move to open positions in which they extend downwardly above the lower ends of said legs at positions totally within the area bounded by vertical planes extending downwardly from the upper ends of the bin discharge openings, and inclined internal walls in said bin on transversely opposite sides of said bottom wall section for directing material in said bin toward said discharge openings.

2. A bin according to claim 1 in which said floor, said internal walls and said side walls cooperate to form chambers in said bin disposed adjacent said internal walls, and heat exchange means mounted in said chambers in heat exchange relation with said internal walls.

3. A bin according to claim 1 wherein said means for moving said door members includes a horizontal shaft mounted on said bin and disposed between said door members, and a linkage extending between said shaft and said door members so that upon rotation of said shaft in one direction said door members are moved from closed positions toward each other to open positions.

4. A bin according to claim 1 in which said means for moving said door members comprises an actuating bar secured to each of said door members and extended in a direction away from said floor opening, each said bar being operable to apply a pulling closing force to one of said door members, and independently operable locking units on said bin positioned below said internal walls for maintaining the actuating bar for each of said door members in a position in which the door member therefor is maintained in a closed position.

5. A bin according to claim 1 wherein said means for moving said door members comprises a pair of door actuating assemblies connected to said door members, each assembly including a pull rod pivotally connected at one end to one of said door members adjacent the lower end thereof, said pull rod extending upwardly and outwardly from said door member and having an opposite end disposed below said bottom wall, a locking and release unit pivotally mounted on said bin below said bottom wall and adjacent the outer edge thereof, said unit having hook means thereon operable to apply a pulling force to the opposite end of said pull rod, and means on said bin releasably engageable with said unit for restraining rotation thereof.

6. A bin according to claim 1 in which said bin floor and bottom wall section comprises an integral unit and said side walls consist of a plurality of wall panels removably mounted on said bottom wall unit.

7. A bin according to claim 1 further including an interal partition extending upwardly from said bottom wall section at a position between said discharge openings so as to divide the interior of said bin into two compartments each of which communicates with one of said discharge openings.

References Cited

UNITED STATES PATENTS

| | | | |
|---|---|---|---|
| 251,880 | 1/1882 | Henderson | 222—129 X |
| 280,170 | 6/1883 | Gilbert | 222—485 X |
| 689,444 | 12/1901 | Williams | 222—485 |
| 731,525 | 6/1903 | Trapp | 105—290 X |
| 757,777 | 4/1904 | Sackett | 222—482 |
| 763,265 | 6/1904 | Courtney | 105—290 |
| 764,355 | 7/1904 | Hart et al. | |
| 775,402 | 11/1904 | Hitchcock | 105—290 |
| 831,649 | 9/1906 | Doods | 105—290 X |
| 1,281,570 | 10/1918 | Hodge | 222—185 X |
| 1,429,056 | 9/1922 | Winter et al. | 105—255 X |
| 1,733,905 | 10/1929 | Randolph | 222—482 |
| 2,123,606 | 7/1938 | Latocha | 222—185 |
| 2,126,949 | 8/1938 | Ditchfield | 222—485 X |
| 2,350,611 | 6/1944 | Hicks | 222—502 X |
| 2,599,978 | 6/1952 | Davis et al. | 222—146 X |
| 2,877,038 | 3/1959 | Cox | 222—502 X |
| 2,948,437 | 8/1960 | Nielsen | 222—129 X |
| 3,019,949 | 2/1962 | Allard | 222—502 X |
| 3,122,106 | 2/1964 | Novelli | 105—249 X |
| 3,137,247 | 6/1964 | Hamilton et al. | 105—255 X |

RAPHAEL M. LUPO, *Primary Examiner.*